(12) United States Patent
Watanabe

(10) Patent No.: US 6,903,811 B2
(45) Date of Patent: Jun. 7, 2005

(54) RANGEFINDER BINOCULARS

(75) Inventor: Naomi Watanabe, Warabi (JP)

(73) Assignee: Kamakura Koki Co., Ltd., Saitama (JP)

( * ) Notice: Subject to any disclaimer, the term of this patent is extended or adjusted under 35 U.S.C. 154(b) by 0 days.

(21) Appl. No.: 10/637,492

(22) Filed: Aug. 11, 2003

(65) Prior Publication Data

US 2005/0036129 A1 Feb. 17, 2005

(51) Int. Cl.$^7$ ............................ G01C 3/08; G02B 23/00
(52) U.S. Cl. ..................................... 356/5.01; 359/407
(58) Field of Search ................................ 356/3.01–5.15; 359/399–435

(56) References Cited

U.S. PATENT DOCUMENTS

| | | | | |
|---|---|---|---|---|
| 5,071,242 A | * | 12/1991 | Yanagisawa | 359/416 |
| 5,280,332 A | * | 1/1994 | Tocher et al. | 356/3.15 |
| 5,282,082 A | * | 1/1994 | Espie et al. | 359/353 |
| 5,483,336 A | * | 1/1996 | Tocher | 356/3.15 |
| 5,574,552 A | | 11/1996 | Dunne | 356/5.05 |
| 5,579,165 A | * | 11/1996 | Michel et al. | 359/630 |
| 5,612,779 A | | 3/1997 | Dunne | 356/5.01 |
| 5,623,335 A | | 4/1997 | Bamberger | 356/5.01 |
| 5,652,651 A | | 7/1997 | Dunne | 356/5.01 |
| 5,680,648 A | * | 10/1997 | Nonaka | 396/109 |
| 5,740,952 A | | 4/1998 | Huckenbeck | 224/271 |
| 6,204,961 B1 | * | 3/2001 | Anderson et al. | 359/353 |
| 6,317,199 B1 | * | 11/2001 | Suzuki | 356/4.01 |
| 6,369,941 B2 | * | 4/2002 | Zadravec | 359/419 |
| 6,542,295 B2 | * | 4/2003 | Boys et al. | 359/410 |
| 6,603,134 B1 | * | 8/2003 | Wild et al. | 250/526 |
| 2003/0002149 A1 | | 1/2003 | Watanabe | |

FOREIGN PATENT DOCUMENTS

| | | | | |
|---|---|---|---|---|
| JP | 2000066113 A | * | 3/2000 | G02B/23/18 |
| JP | 3089101 | | 10/2002 | |
| WO | WO 96/22509 | | 7/1996 | |

* cited by examiner

Primary Examiner—Thomas H. Tarcza
Assistant Examiner—Brian K Andrea
(74) Attorney, Agent, or Firm—Arent Fox PLLC

(57) ABSTRACT

The range binoculars include first and second observing optical systems, a laser beam-emitter for emitting a laser beam, a measuring optical system for collimating the laser beam and sending the collimated laser beam to a target. A laser beam-receiving device receives the laser beam reflected by the target, while a distance-determining device determines the distance between the observation place and the target from the flight time of the laser beam taken from the laser beam-emitter to the laser beam-receiver. A measurement-displaying device displays the measurements obtained by the distance-determining device.

16 Claims, 3 Drawing Sheets

RANGEFINDER BINOCULARS

BACKGROUND OF THE INVENTION

1. Field of the Invention

This invention relates to range binoculars, more particularly, the invention relates to a pair of binoculars having an optical system that measures distance and an optical system for observation.

2. Background Art

Typically, conventional range binoculars emit an infrared ray as a distance-measuring laser beam, collimate and aim the emitted infrared ray at a target, then receive a reflected ray from the target, measure the flight time taken from the ray-emitting point to the reflected ray-receiving point, and determine the distance from the observation place, i.e., the ray-emitting point to the target.

Conventional range binoculars are provided with a beam splitter, which permits an infrared ray to be transmitted, but does not permit visible rays to be transmitted between the objective lens of the optical system for observation and the erecting prism. As such, the infrared ray beam goes to the beam splitter, is reflected, and returns to the objective lens. The beam is collimated by the objective lens and transmitted to the target. Furthermore, in the conventional range binoculars, visible rays entering the objective lens for observation go through the beam splitter and advance to the eyepieces at which an image is formed.

The beam splitter used in the conventional range binoculars is required to assure the reflection of the distance-measuring infrared ray thereon and, at the same time, the transmission of the observed visible rays through itself at a high transmittance. Thus, the beam splitter is required to have a high performance.

To produce such high performance beam splitters is technically difficult, thereby resulting in high production costs. Consequently, conventional range binoculars using such beam splitters are rather expensive.

Furthermore, such high performance beam splitters are not able to transmit all of the visible rays reaching the beam splitters. Thus, conventional range binoculars, due to the presence of the beam splitter, inevitably reduce the transmittance of the observed visible rays and the resolving power thereof. As a result, images are degraded using conventional range binoculars.

The focusing mechanism of binoculars is of an independent feeding type (IF Type) or a central feeding type (CF Type). It is well known in the industry that focusing is easier with the CF Type binoculars than with the IF Type binoculars. In CF Type binoculars, an internal focusing lens is inserted between the objective lens and the erecting prism. The user focuses by moving the focusing lens. Therefore, the CF Type binoculars must be provided with the internal focusing lens and a means for moving in a space between the objective lens and the erecting prism.

However, it is very difficult and almost impossible to find a space to place an internal focusing lens in such conventional range binoculars, because the beam splitter is already fixed between the objective lens and the erecting prism. Thus, conventional rangefinder binoculars can hardly use the CF Type focusing systems, which is disadvantageous.

SUMMARY OF THE INVENTION

An object of the invention is to overcome the above-described drawbacks of conventional range binoculars. It is also an object of the invention to provide a pair of range binoculars which can be produced at a lower cost, has a lower degree of image degradation, and uses CF Type focusing means.

In order to achieve the above-described objects, the invention provides a pair of range binoculars, which includes a first observing optical system separate from a second observing optical system. An emitting device emits a laser beam to measure a distance, while a rangefinder optical system, provided separately from the first and second observing optical systems, collimates the emitted laser beam and aims the laser beam at a target. A laser beam-receiver receives the laser beam reflected by the target so a distance-measuring device can determine a distance from the observation place to the target. A display indicates the distance obtained by the distance-measuring device.

The rangefinder optical system includes a reflecting mirror for reflecting the laser beam emitted by the emitting device to the distance-measuring device and a collimating lens for collimating the distance-measuring laser beam reflected from the mirror. The first observing optical system includes a first objective optical member, a first eyepiece optical member, and a first optical member for assembling an image of the visible rays from the first objective optical member and sending the image to the first eyepiece optical member. The second observing optical system includes a second objective member, a second eyepiece member, and a second optical member for assembling an image of the visible rays from the second objective optical member and sending the image to the second eyepiece optical member.

The first and second optical members are beam splitters, which separate the distance-measuring laser beam and the visible rays entering the observing optical system from each other to remove the distance-measuring laser beam from the light path of the observing optical system before it is sent to the distance-measuring device.

A body case and an attachment case are provided with the body case having the first observing optical system and the second objective optical member contained therein. The attachment case, which has the second eyepiece optical member and the second optical member, is connected with the body case to allow the attachment case to rotate around the axis of the second objective optical member. The distance-measuring laser beam can generate an infrared ray.

DETAILED DESCRIPTION OF PREFERRED EMBODIMENTS

Figure 1:
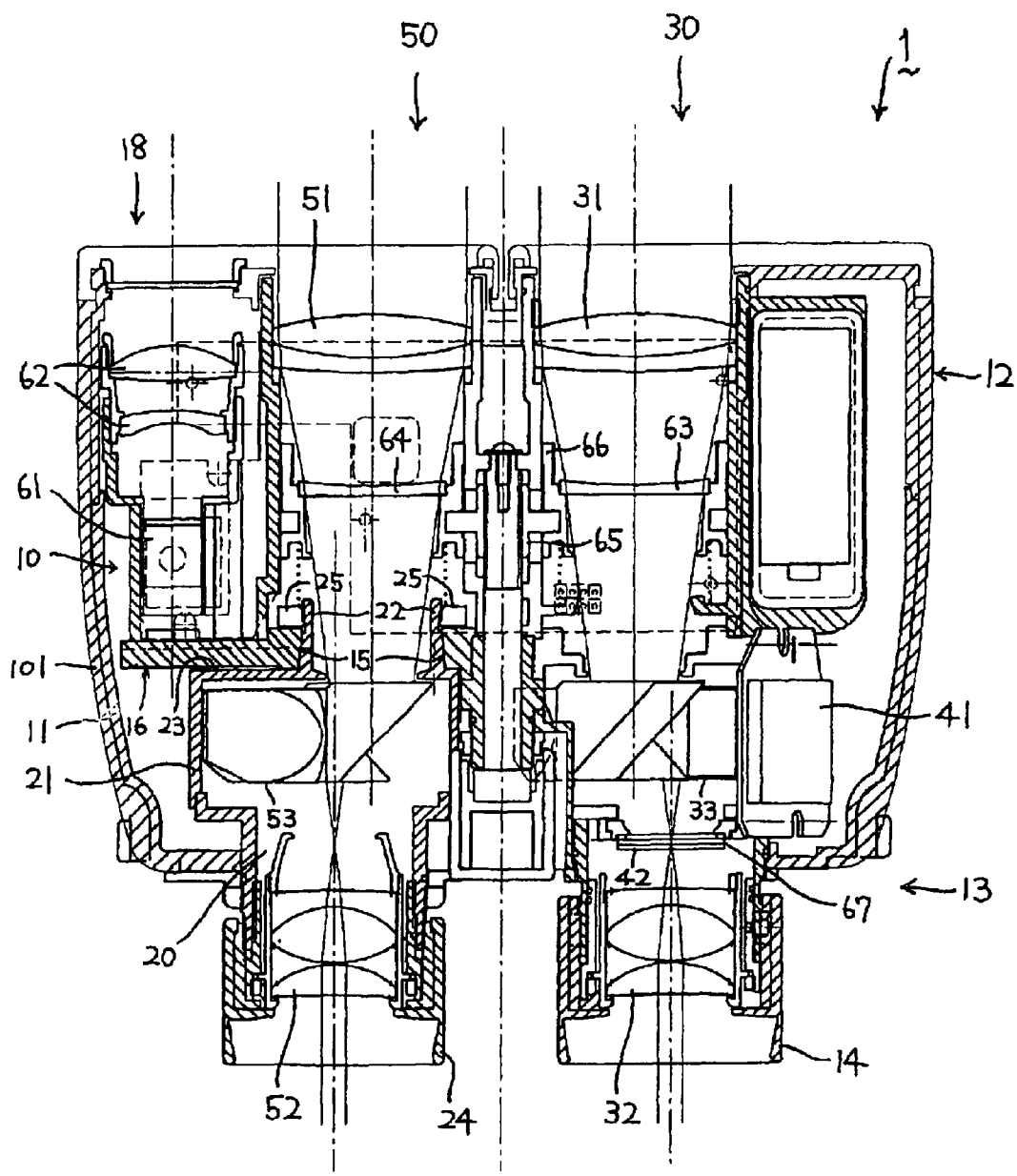
FIG. 1 is a cross-sectional plan view of the range binoculars according to an embodiment of the invention.
Figure 2:
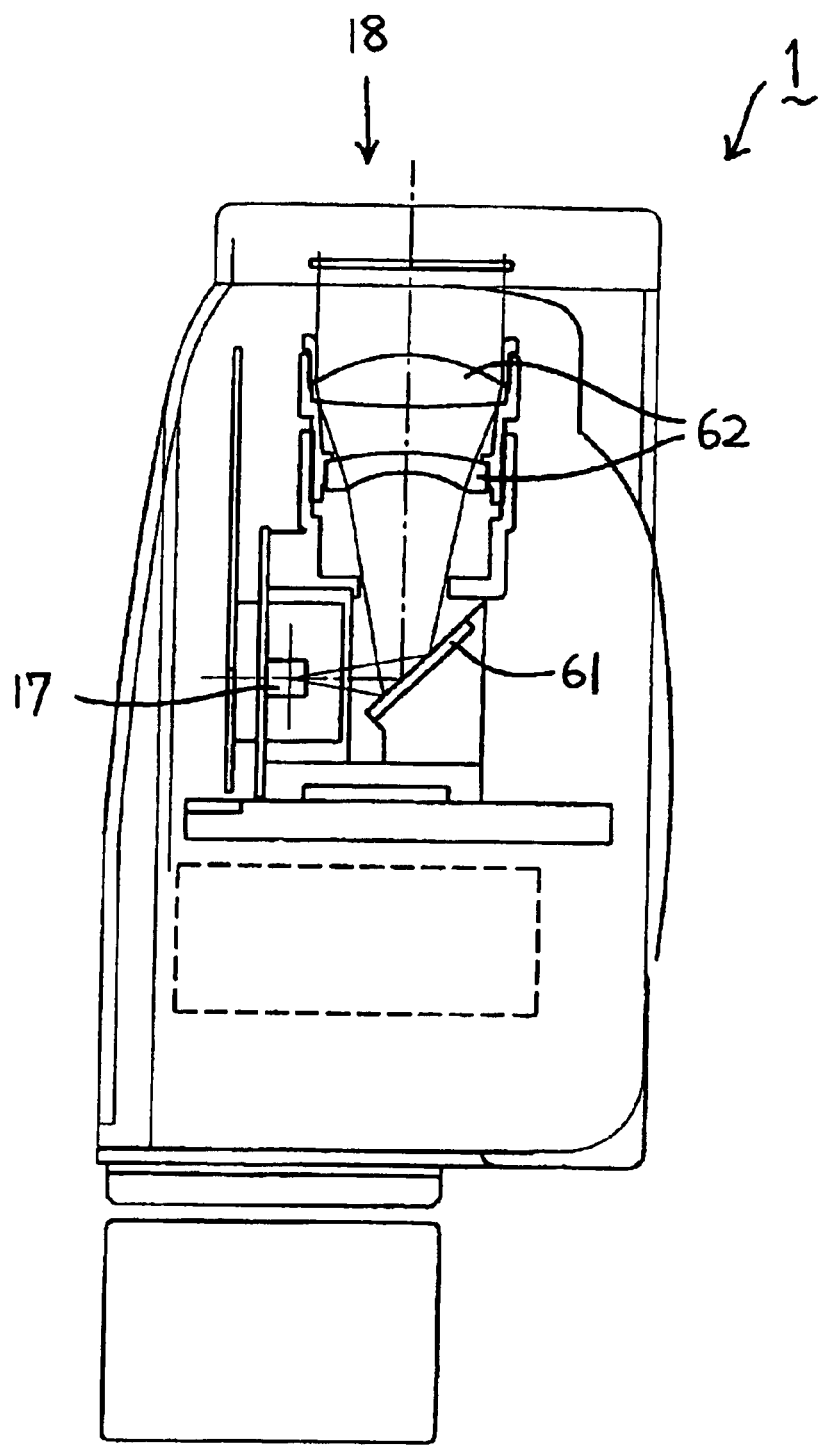
FIG. 2 is a cross-sectional plan view of the left side of the range binoculars shown in FIG. 1.

FIGS. 1 and 2 illustrate the structural configuration of the range binoculars according to a preferred embodiment of the invention. FIG. 1 is a cross-sectional plan view of range binoculars 1. FIG. 2 is a cross-sectional plan view of the left side of a part of the range binoculars 1. The range binoculars 1 include body case 11, attachment case 21 and outer case 101.

The body case 11 and a body 10 of the range binoculars 1 are contained in the outer case 101. The body 10 includes a first optical system. The range binoculars 1 also include an attachment 20 contained in the attachment case 21, wherein the attachment 20 includes a second optical system.

The range binoculars 1 include a pair of observing optical systems, that is, first and second observing optical systems. The first observing optical system 30 includes a first objective optical member 31, first eyepiece optical member 32, first internal focusing lens 63 and first optical member 33. The second observing optical system 50 includes a second objective optical member 51, second eyepiece optical member 52, second internal focusing lens 64 and second optical member 53.

Figure 3:
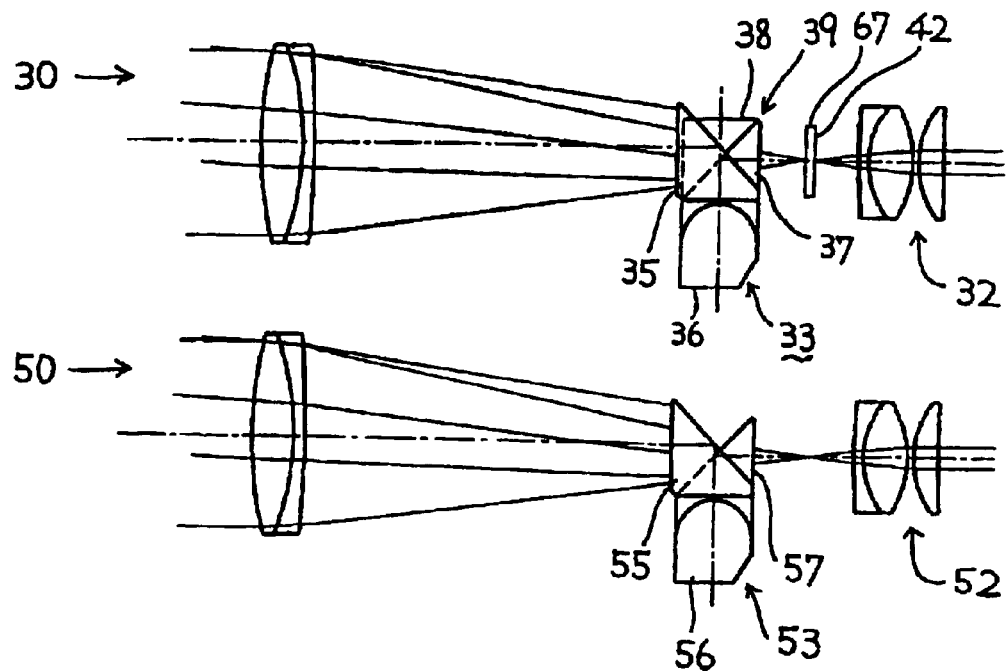
FIG. 3 is a schematic diagram illustrating the optical system of the range binoculars shown in FIG. 1.
Figure 4:
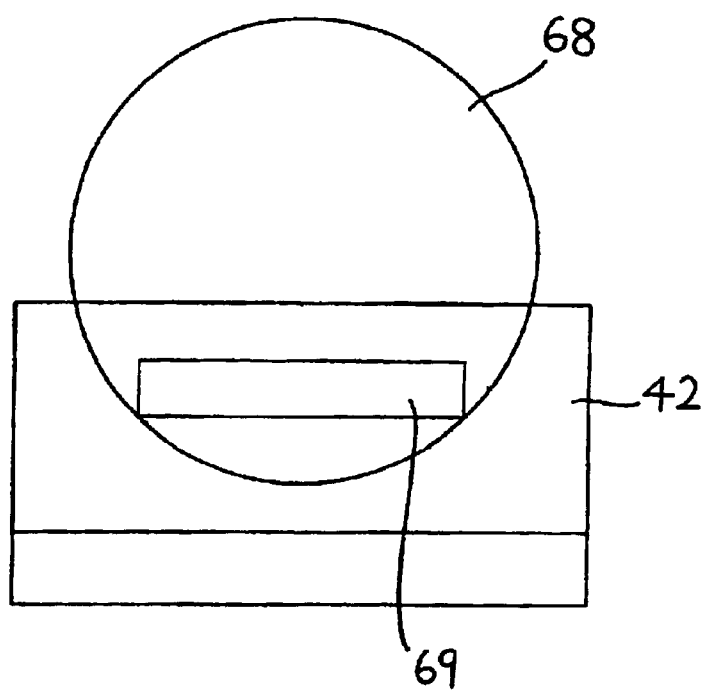
FIG. 4 is a schematic diagram illustrating the relationship between the field of view and the LCD.

FIG. 3 is a schematic diagram illustrating the first and second observing optical systems of the range binoculars 1 shown in FIG. 1.

As shown in FIG. 1, the first objective optical member 31, first internal focusing lens 63, and first optical member 33 form an optical axis of a first objective optical system, and the first eyepiece optical member 32 and first optical member 33 form an optical axis of the first eyepiece optical system. The second objective optical member 51, second focusing lens 64, and second optical member 53 form an optical axis of the second objective optical system, and the second eyepiece optical member 52 and second optical member 53 form an optical axis of the second eyepiece optical system.

The body 10 of the binoculars 1 contains the first observing optical system 30 and the second objective optical member 51 of the second observing optical system 50. The body case 11 surrounds the body 10 as an outer structural member.

The body case 11 includes the objective part 12, which contains the first objective optical member 31 and the second objective optical member 51, and the eyepiece part 13, which contains the first eyepiece optical member 32 and the first optical member 33. The eyepiece part 13 is integrally connected to the objective part 12. The eyepiece part 13 includes a first eyepiece cylindrical frame 14, which contains the first eyepiece optical member 32. A face 16 provided on the eyepiece part 13 includes a hole 15, wherein an axis of the hole 15 coincides with the optical axis of the second objective optical system.

The attachment 20 includes the second eyepiece optical member 52 and second optical member 53 of the second observing optical system 50, which are contained by the attachment case 21 as an outer structural member.

The attachment case 21 includes a second eyepiece cylindrical frame 24, which contains the second eyepiece optical member 52 at one end face thereof, and, at another end face 23, a circular projection 22, which can engage the hole 15 provided in the face 16 of the objective part 12. The axis of the circular projection 22 coincides with the optical axis of the second objective optical member when the circular projection 22 engages the hole 15. The circular projection 22 is provided with a connecting member 25. The connecting member 25 contacts the inner wall of body case 11 when the circular projection 22 is inserted in the hole 15 and the face 16 of the body case 11 contacts the face 23 of the attachment case 21. The connecting member 25 is a means for connecting the body case 11 and attachment 21 with each other, thereby allowing the attachment case 21 to rotate within the hole 15 of the body case 11.

The body 10 further includes a laser diode 17, which is a laser beam-emitting means, and a distance-measuring optical system 18.

The distance-measuring optical system 18 is provided such that an optical axis of the system 18 is parallel to optical axes of the first observing optical system 30 and the second observing optical system 50 at a position between the second observing optical system 50 and a side wall of distance-measuring optical system 18 adjacent to the second observing optical system 50 in the objective part 12 of the body case 11. The distance-measuring optical system 18 includes a mirror 61 and collimating lens 62. The mirror 61 reflects a distance-measuring laser beam emitted by the laser diode 17 and sends the reflected distance-measuring laser beam to the collimating lens 62, which collimates the distance-measuring laser beam reflected from the mirror 61. Preferably, the collimating lens 62 includes two lenses, however, it is within the scope of this invention to vary the number of lenses used, so long as the above-described function is not lost. Similarly, it is within the scope of the invention to use any suitable lens capable of collimation as the collimating lens 62.

Thus, the range binoculars 1 have a distance-measuring system 18, first observing optical system 30, and second observing optical system 50.

The laser diode 17 is fixed under the mirror 61 can aim an infrared ray, also known as the distance-measuring laser beam, at the mirror 61. The wavelength of the infrared ray emitted by the laser diode 17 is, for example, 905 nm, and may be any suitable wavelength as long as distance measurement is possible using the measuring method mentioned below.

In the range binoculars according to this invention, it is not necessary to always send the distance-measuring laser beam from the laser diode, through the mirror, to the collimating lens. Rather, the distance-measuring laser beam may be sent directly from the laser diode to the collimating lens, that is, without any mirrors therebetween.

Moreover, it is within the scope of the invention to position the laser beam-emitting part and distance-measuring optical system anywhere within the range binoculars.

The first objective optical member 31 and the second objective optical member 51 each includes a lens group having a plurality of objective lenses. It is within the scope of the invention to have the first objective optical member 31 and the second objective optical member 51 be substantially similar to objective optical members used in conventional range binoculars.

The first eyepiece optical member 32 and the second eyepiece optical member 52 each includes a lens group having a plurality of eyepieces. As mentioned above, the first eyepiece optical member 32 is mounted on the first eyepiece cylindrical frame 14 inserted in the eyepiece part 13 of the body case 11. The second eyepiece optical member 52 is mounted on the second eyepiece cylindrical frame 24 inserted in the attachment case 21. Similarly, it is within the scope of the invention to have the first eyepiece optical member 32 and the second eyepiece optical member 52 be substantially similar to eyepiece optical members used in conventional range binoculars.

The first internal focusing lens 63 is fixed between the first objective optical member 31 and the first optical member 33 wherein the optical axis of the first internal focusing lens 63 is aligned with the optical axis of the first objective optical member 31. The second internal focusing lens 64 is provided between the second objective optical member 51 and the second optical member 53 wherein the optical axis of the second internal focusing lens 64 is aligned with the optical axis of the second objective optical member 51. The first internal focusing lens 63 and second focusing lens 64 are fixed to a frame 66 of focusing lens-moving means 65 provided between the first observing optical system 30 and the second observing optical system 50. Operating the focusing lens-moving means 65 moves the frame 66, which, in turn, allows the first internal focusing lens 63 and second focusing lens 64 to travel together in a direction of the first objective optical member 31 and the second objective optical member 51, or in the direction of the first optical member 33 and the second optical member 53. Thus, the focus of the first observing optical system 30 and the second observing optical system 50 is controlled. That is, the range binoculars 1 use a CF Type of focusing method.

As shown in FIG. 3, the second optical member 53, which is commonly known as a Porro II erecting prism, includes an assembly of a second upper prism 55, second side prism 56, and second lower prism 57. The assembly of prisms is positioned such that a ray coming through the second objective optical system enters the second objective optical member 51 and passes sequentially through second upper prism 55, second side prism 56 and second lower prism 57, and is then sent to the second eyepiece optical system. Due to the structural arrangement of the second optical member 53, the second eyepiece optical member 52 of the second observing optical system 50 has an optical axis that is not aligned with the optical axis of the second objective optical member 51.

Similarly, the first optical member 33, which is commonly known as a Porro II erecting prism, has a structure that is identical to the structure of the second optical member 53. In particular, the structure of the first optical member 33 includes a first upper prism 35, first side prism 36, and first lower prism 37, but further includes a rectangular prism 38, as shown in FIG. 3. A bottom face of the rectangular prism 38 contacts a bottom face of the first lower prism 37. The assembly of the first lower prism 37 and the rectangular prism 38 form a beam splitter 39. Therefore, the first optical member 33 has, in addition to the same function as the second optical member 53, the function of a beam splitter, which transmits an infrared ray and reflects visible light. Due to the beam splitting function of the first optical member 33, an infrared ray, which is emitted by the laser diode away from the range binoculars 1, reflected by an object back to the binoculars 1 and into the optical path of the first observing optical system 30 through the first object optical member 31, is transmitted by the beam splitter 39 and guided to the outside of the first observing optical system 30. On the other hand, visible light, which is reflected by the object back into the optical path of the first observing optical system 30 through the first object optical member 31, is reflected by the beam splitter 39 and sent to the first eyepiece optical member 32.

As shown in FIG. 3, the focusing plate 67 is provided between the first optical member 33 and the first eyepiece optical member 32 of the first observing optical system 30.

The body 10 further includes a laser beam-receiving means 41 disposed near an inner wall on the side where laser diode 17 is placed. The laser beam-receiving means 41 is a photodetector which receives, for example, an infrared ray separated by the first optical member 33, as mentioned above.

Furthermore, the body 10 has a range-finding means (not shown), connected to the laser diode 17 and laser beam-receiving means 41 for determining a distance between the observer and the target. The distance is determined based on the flight time of the infrared ray from the emission of the infrared ray by the laser diode 17 to reception by the laser beam-receiving means 41. A range-finding means, for example, the range-finding means disclosed in JP Translated PCT Application Publication No. 10-512954(1998), U.S. Pat. Nos. 5,574,552, 5,612,779, 5,623,335, 5,652,651 or 5,740,952.

An LCD 42 is mounted on the focusing plate 67 for displaying the measurement result. The LCD 42, which is connected to the range-finding means, displays the distance between the observation place and the target or object. The LCD 42 is disposed such that a display window 69 of the LCD 42 appears at a lower part of a view 68 formed on the focusing plate 67.

Operation of the above-described range binoculars 1 is provided below.

A pupil distance is adjusted by rotating the attachment 20. As mentioned above, the axis of the circular projection 22 is aligned with the optical axis of the second objective optical member 51. Consequently, when the second optical member 53 is turned by rotating the attachment 20, rays traveling along the optical axis of the second objective optical member 51 always enter the second optical member 53 at the same point. This means that the rotation of the attachment 20 does not change the image obtained in the second observing optical system 50. Also, since the optical axis of the second objective optical member 51 is not aligned with the axis of the second eyepiece optical member 52, when the attachment 20 is rotated, the optical axis of the second eyepiece optical member 52 included in the attachment 20 turns, drawing a circular arc having a center on the axis of the second objective optical member 51 and having a radius corresponding to a difference between the optical axis of the second objective optical member 51 and the optical axis of the second eyepiece optical member 52. Since the optical axis of the second objective optical member 51 is provided in the body case 11, separate from the attachment 20, together with the optical axis of the first objective optical member 31 and the optical axis of the first eyepiece optical member 32, when the attachment 20 is rotated, the distance between the optical axis of the second objective optical member 51 and the optical axis of the first eyepiece optical member 32 is not changed. In summary, when the attachment 20 is rotated, the distance between the optical axis of the second eyepiece optical member 52 and the optical axis of the first eyepiece optical member 32 is changed, which means the distance between the second eyepiece cylindrical frame 24 accommodating the second eyepiece optical system 52, and the first eyepiece cylindrical frame 14 accommodating the first eyepiece optical member 32, is changed. Thus, the pupil distance in the range binoculars 1 can be adjusted without affecting the visual field.

The user observes an object with the range binoculars 1 of the invention in the same way as with conventional binoculars. When an object is observed with the range binoculars 1 of the invention, visible light reflected by the object enters the binoculars through the first and second objective optical members 31 and 51. The visible light entering the first observing optical system 30 through the first objective optical member 31 proceeds along the optical path determined by the first objective optical member 31, and enters the first optical member 33, which functions as a beam splitter. Since the beam splitter 39 of the first optical member 33 reflects visible light, the visible light is reflected by the beam splitter 39 and sent to the first eyepiece optical member 32 along the optical path determined by the first eyepiece optical member 32. Visible light entering the second observing optical system 50 through the second objective optical member 51 proceeds along the optical path determined by the second objective optical member 51 to the second optical member 53, advances through the second optical member 53, and reaches the second eyepiece optical member 52 via the optical path determined by the second eyepiece optical member 52. In this way, the same image of the object is made by each of the left and right optical systems.

As mentioned above, the range binoculars 1 do not have a beam splitter provided between the second objective optical member 51 and the second optical member 53, as is typical in conventional binoculars. Therefore, the visible light entering the second observing optical system 50 through the second objective optical member 51 reaches the second eyepiece optical member 52 without passing through the beam splitter. Thus, the range binoculars 1 do not reduce the transmission amount of visible light or the resolving power. Consequently, the second observing optical system 50 also produces clear images.

The measurement of the distance between the observer and an object using the range binoculars 1 is carried out in the following way. First, the object is brought into focus. Then, the mirror 61 is irradiated with an infrared ray produced by the laser diode 17. The mirror 61 reflects the infrared ray, which is then sent to the collimating lens 62. The infrared ray, collimated with the collimating lens 62, advances to the object. The infrared ray is reflected by the object and sent to the range binoculars 1 through the first objective optical member 31. The incoming infrared ray proceeds along the path determined by the first objective optical member and enters the first optical member 33, which performs a beam splitting function. Since the infrared rays travel through the beam splitter 39 of the first optical member 33, the infrared ray is transmitted by the beam splitter 39 and guided to the outside of the first observation optical system 30. Then, the infrared ray is received and detected by the laser beam-receiving means 41. The distance between the observing point and the object is calculated by the range-finding means based on the length of time from the emission of an infrared ray by the laser diode 17 to the detection of the reflected ray by the laser beam-receiving means 41.

When the calculation is finished, a signal indicating the distance is sent to the LCD 42, wherein the distance is shown on the display window 69 of the LCD 42. The displayed distance appears at a lower part of view 68, which is obtained from the first observing optical system 30. As a result, the user sees the distance on the display.

Hereinbefore has been explained an embodiment of the invention. Needless to say, the invention is not limited to the discussed embodiment only but can be suitably modified without departing from the scope of the invention.

For example, for the method of displaying the result of the measurement, a bright LED display may be formed in the view field 68 by a relay lens together with the beam splitter of the erecting prism. Alternatively, as disclosed in JP Utility Model 3074643, an LCD, reticle, relay lens, and reflecting mirror may be arranged so an image displayed on the LCD is reflected onto the reticle through the relay lens and reflecting mirror. The use of the relay lens prevents the LCD itself from coming into the view field, which results in the display of the measurement with little influence on observations.

The range binoculars 1 in accordance with the invention separate the observing optical systems from the distance-measuring system. Therefore, it is not necessary to have an expensive beam splitter to send a distance-measuring laser beam. Further, the collimating lens used to collimate a distance-measuring laser beam in the range binoculars 1 of the invention need not have any observation function. Therefore, a cost-effective lens, such as a plastic lens, may be used. These features of the invention advantageously reduce the production cost of the range binoculars 1.

The range binoculars 1 in accordance with the invention do not provide a beam splitter between the objective optical member and the erecting prism. Therefore, visible light needed for observation reaches the eyepiece optical member without passing through any beam splitters. As such, the transmission of visible light or the resolving power is not reduced. A clear image is also obtained through the second observing optical system.

Since the range binoculars 1 in accordance with the invention does not have a beam splitter between the objective lens and the erecting prism, it is possible to place the internal focusing lens and corresponding moving means between the objective lens and the erecting prism. Thus, the CF type focusing mechanism, which can easily control the focusing, is used in the range binoculars 1 of the invention.

What is claimed is:

1. A pair of range binoculars comprising:
   a first observing optical system, wherein the first observing optical system comprises:
     a first objective optical member,
     a first eyepiece optical member, and
     a first optical member, wherein an image from a visible light passing through the first objective optical member is assembled and sent to the first eyepiece optical member;
   a second observing optical system separate from the first observing optical system, wherein the second observing optical system comprises:
     a second objective optical member,
     a second eyepiece optical member, and
     a second optical member, wherein an image from a visible light passing through the second objective optical member is assembled and sent to the second eyepiece optical member;
   laser beam-emitting means for emitting a laser beam to measure a distance from an observation place to a target;
   a distance-measuring optical system for collimating the laser beam emitted by the laser beam-emitting means and sending the laser beam collimated by the distance-measuring means to the target, wherein the distance-measuring optical system is provided separate from the first observing optical system and the second observing optical system;
   laser beam-receiving means for receiving the laser beam reflected by the target;
   distance-determining means for determining a distance between the observation place and the target using a flight time of the laser beam taken from the laser beam-emitting means to the laser beam-receiving means; and
   measurement-displaying means for displaying the distance obtained by the distance-measuring means,
   wherein one of the first optical member and the second optical member is a beam splitter which transmits the laser beam,
   wherein the laser beam then deviates from an optical path of the observing optical system and enters the distance-determining means, wherein the beam splitter reflects the visible light, and
wherein the reflected visible light enters the observing optical system.

2. The range binoculars according to claim 1, wherein the distance-measuring optical system has a mirror to reflect the laser beam emitted by the laser beam-emitting means and a collimating lens to collimate the laser beam reflected by the mirror.

3. The range binoculars according to claim 1, wherein the first and second optical members each include an upper prism, side prism, and lower prism assembled together.

4. The range binoculars according to claim 3, wherein an optical axis of the second eyepiece optical member is not aligned with an optical axis of the second objective optical member.

5. The range binoculars according to claim 3, wherein the first optical member further comprises a rectangular prism having a bottom face contacting a bottom face of the lower prism to form a beam splitter.

6. The range binoculars according to claim 5, wherein the first observing optical system further comprises a focusing plate disposed between the first optical member and the first eyepiece optical member.

7. The range binoculars according to claim 1, further comprising:
   a body case containing the first observing optical system and the second objective optical member; and
   an attachment case containing the second eyepiece optical member and the second optical member,
   wherein the attachment case is connected to the body case to facilitate rotation of the body case around an optical axis of the second objective optical member.

8. The range binoculars according to claim 7, wherein an LCD is mounted on a focusing plate to display the distance obtained by the distance-measuring means.

9. The range binoculars according to claim 1, wherein the laser beam is an infrared ray.

10. The range binoculars according to claim 2, wherein the first and second optical members each include an upper prism, side prism, and lower prism assembled together.

11. The range binoculars according to claim 2, wherein an optical axis of the second eyepiece optical member is not aligned with an optical axis of the second objective optical member.

12. The range binoculars according to claim 10, wherein the first optical member further comprises a rectangular prism having a bottom face contacting a bottom face of the lower prism to form a beam splitter.

13. The range binoculars according to claim 10, wherein the first observing optical system further comprises a focusing plate disposed between the first optical member and the first eyepiece optical member.

14. The range binoculars according to claim 2, wherein an LCD is mounted on a focusing plate to display the distance obtained by the distance-measuring means.

15. The range binoculars according to claim 2, further comprising:
   a body case containing the first observing optical system and the second objective optical member; and
   an attachment case containing the second eyepiece optical member and the second optical member,
   wherein the attachment case is connected to the body case to facilitate rotation of the body case around an optical axis of the second objective optical member.

16. The range binoculars according to claim 2, wherein the laser beam is an infrared ray.

* * * * *